March 29, 1927.
A. EHRLICH
1,622,629
AIRCRAFT WITH SWINGING WINGS
Filed April 8, 1926
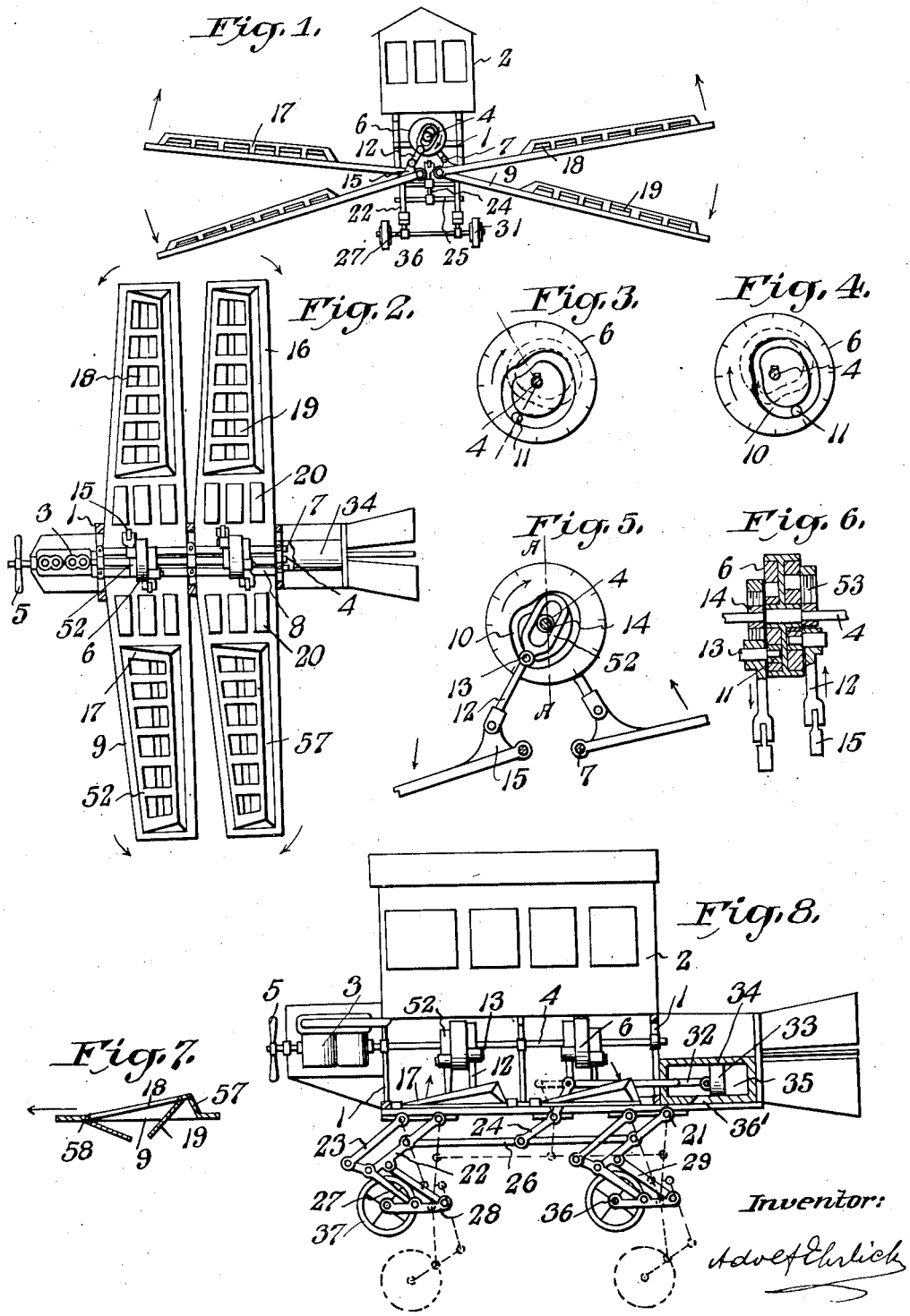

Patented Mar. 29, 1927.

1,622,629

UNITED STATES PATENT OFFICE.

ADOLF EHRLICH, OF BUDAPEST, HUNGARY.

AIRCRAFT WITH SWINGING WINGS.

Application filed April 8, 1926. Serial No. 100,726.

My invention relates to aircrafts with swinging wings and has for its object an improvement of the utilization of the power and also an increase in the carrying capacity.

In aeroplanes moved by means of propellers and inclined supporting surfaces the greatest part of the motive power is consumed for the forward movement of the aircraft and only a small portion thereof for lifting the aircraft although for the latter purpose considerably more power is necessary than for the forward movement of the aircraft which is already floating. Aeroplanes can therefore only rise and remain floating at an unaltered altitude, or can descend slowly when they move forward rapidly at the same time. These drawbacks, with which is combined an insufficient carrying capacity of the aircraft are eliminated according to the present invention in that the greatest portion of the motive power is used for lifting the aircraft and a smaller portion thereof for the forward movement.

The main feature of my invention resides in the fact that the lifting of the aircraft is effected by means of blades, swinging alternately upwards and downwards on shafts remaining horizontal, which blades are actuated by cam discs. The forward movement is effected by a horizontal forwardly directed component of the force which mainly has a lifting effect.

A further characteristic feature of the invention resides therein that the aircraft, in order to facilitate the starting of the flight, can project itself away from the ground by means of previously folded and suddenly stretched legs.

The remaining characteristic features of the invention will appear from the following detailed description and claims.

In the following detailed description the invention is described with reference to the accompanying drawings.

Figure 1 is a front elevation of the aircraft, for example with two pairs of wings, partly in section.

Figure 2 is a plan after removal of the cabin.

Figures 3, 4 and 5 illustrate cam discs for actuating the wings.

Figure 6 is a section of a cam disc on the line A—A of Figure 5.

Figure 7 illustrates in cross section a wing constructed in accordance with the invention.

Figure 8 is a side elevation of the aircraft with a projecting arrangement arranged under the framework of the aircraft. The full lines illustrate the projecting rods in the folded position and the broken lines in the stretched position.

The framework 1 carries at the top the cabin 2, lower down the motor 3, on the main shaft of which there may be secured at the front a small propeller 5. At the rear there are secured on the main shaft 4, one behind the other, two cam discs 6. Underneath the motor shaft 4 there are arranged parallel thereto two horizontal shafts 7 for the wings 9. The shafts 7 carry, by means of hinged links 8, two oscillatory wings 9. Each two oppositely disposed wings are moved up and down alternately by means of a common disc. For this purpose there are provided on the two side faces of each disc 6 relatively displaced grooves 10, 10'. With the groove 10, 10' there engages by means of a roller 11, 11' a pin 13, 13' projecting from the driving rod 12, 12'. The free end of 52, 52' of the said rod is enlarged and is provided with a recess 53, 53' so that this can embrace the motor shaft 4 by means of a roller 14, 14'. The lower end of the driving rod is hinged to a short projection 15, 15' projecting upwardly from the wing 9 near the shaft 7.

The groove 10 or 10' in the cam disc 6 consists of two sections, one section having twice the length of arc than the other. The limiting surfaces of the grooves are formed as a circular volute. By reason of this construction of the grooves 10, 10' the separate wing blades connected thereto by the driving rods 12, 12' are moved up and down during the uniform rotation of the shaft 4 at a constant speed. The cam discs 6 are rotated in the direction of the arrows, whilst the speed at which the wings swing downwardly is twice the speed of the upward movement. By reason of this difference in speed the downwardly swinging wings in comparison with the upwardly swinging wings meet with at least four times the air resistance so that the downwardly swinging wings lift the aircraft body to a greater extent than the upwardly moving wings tends to lower the aircraft.

The middle portion 17 of the wing surface is formed half roof shape and is so arranged that the roof surface 17 is inclined downwardly towards the front (Figure 7).

In order to ensure the stability of the aircraft the right hand front wing 9 forms a pair with the left hand rear one and the left hand front one forms a pair with the right hand rear one when two pairs of wings are provided. If three pairs of wings are provided the middle right hand one and the middle left hand wing form the third pair of wings. The wings forming a pair thus carry out the upwardly and downwardly swinging movement simultaneously.

The arrangement of the wing shafts 7 underneath the heavy parts of the aircraft body also increases the stability of the floating aircraft. As the centre of gravity of the floating aircraft simultaneously forms its fulcrum and the forces producing a torque thereon become the more effective the farther they act from the fulcrum, therefore, the gravities of the wings come into consideration to a predominating extent as torques. These torques may also have a less disturbing effect on the sustenance of the floating air-craft the lower they come into underneath the common centre of gravity.

The difference of an aircraft with the common center of gravity situated above the horizontal plane of the wings from an aircraft with the center of gravity beneath the wings consists therein that in the former case, i. e., the centre of gravity above the wings, the originally upright aircraft getting by any accident sideways inclined, the torque on the raised half, owing to the increased horizontal distance of the partial gravity of the respective wing from the vertical line of the common centre of gravity too increases, and the torque on the lowered half, owing to the less distant partial gravity, decreases whereby the inclined aircraft automatically gets erected, whereas, the common centre of gravity being beneath the horizontal plane of the wings, the torque on the raised half of the accidentally sideways inclined aircraft decreases, and that on the lowered half increases whereby the inclination of the accidentally sideways inclined aircraft automatically increases until the originally upright aircraft gets totally overturned.

The stability of the floating aircraft is still further increased in that the half-roof shaped surfaces 17 of the wings, which facilitate upward swinging, are surrounded by a flat-seam, whereby in the case of an eventual turning of the whole aircraft the cutting of the wing edges into the air is rendered as difficult as the movement thereof out of the air on the other side.

The upward swinging of the wing relatively to its downward swinging is also considerably facilitated by reason of the fact that the middle wing part 17 is provided with openings 18 in which are arranged flaps 19 which open downwardly. These flaps close by reason of the air resistance during the downward movement and are opened during the upward movement. As the downwardly swinging wing bears mainly against the air resistance occurring at the wing points and thus raises the aircraft body it is possible to provide in the parts of the wing surface, adjacent the shaft 5, large recesses 20 which render the downward view possible.

The surface 17 of the wing 9 consists by reason of the half roof like construction of a considerably larger part 58, slightly inclined towards the front, and a smaller part 57, steeply inclined towards the rear, whereby the component of the air resistance directed horizontally forwards and which occurs during the downward swinging of the wing, moves the aircraft forwardly.

The starting device illustrated in Figure 8 consists substantially of four three membered artificial legs and the corresponding link rods. On the frame 1 are provided transverse shafts 21 which at the front and rear each rotatably carry two artificial upper leg portions 22. The two front and the two rear upper leg portions 22 are connected together by means of a transverse rod 25. To the middle of the two transverse rods 25 is hingedly connected a longitudinal rod 26 so that by reason of this connection all the four upper leg portions can be swung simultaneously forwards or backwards on their shafts 21.

The lower end of the upper leg portion 22 is hingedly connected to the fulcrum of the lower leg portion 27 forming a two armed lever. To the shorter upper arm of the lower leg portion 27 is connected a link rod 23 which is rotatably mounted on a transverse shaft in the frame 1. The lower end of the lever 27 is hingedly connected to the middle of the foot portion 28. The free end of the foot portion 28 is connected by a link rod 29 to a projection 30 of the upper leg portion 22. The other end of the foot portion 28 carries a transverse shaft 36 for the running wheels 31.

For suddenly stretching the bent legs there is provided a two armed lever 24 of which the lower arm is connected to the longitudinal rod 26 and of which the upper arm is connected to the rod 32 of the piston slidably mounted in the cylinder 34. At the bottom of the cylinder 34 is formed an opening 36 which enables the explosion gases formed and the compressed air used, to escape. A force suddenly acting in the cylinder space 35 on the piston 33 produces, a sudden movement of the longitudinal rod in consequence of which all the bent legs are suddenly stretched and the aircraft at the commencement of flight is projected upwardly.

I am aware that other modifications besides those shown in the drawing may be found useful and lie within the scope of my invention.

What I claim as my invention and desire to secure by Letters Patent is:—

1. In an aircraft with swinging wings the combination of a power engine, cam discs fastened on the longitudinal extension of the driving shaft of said power engine, a groove on each side of each of the discs, a connecting rod between the disc and each wing, a pin on said connecting rod and a roller on said pin engaging in said groove, said connecting rod having an enlarged end, a slot in this enlarged end, a roller in said slot mounted on the driving shaft.

2. In an aircraft with swinging wings the combination of a power engine, cam discs fastened on the longitudinal extension of the driving shaft of said power engine, a groove on each side of each of the discs, a connecting rod between the disc and each wing, a pin on said connecting rod and a roller on said pin engaging in said groove, said connecting rod having an enlarged end, a slot in this enlarged end, a roller in the slot mounted on the driving shaft, said grooves on the cam discs so constructed and arranged that the downward swinging of the wings takes place at twice the speed of the upward swinging.

3. In an aircraft with swinging wings the combination of a power engine, cam discs fastened on the extended driving shaft, a groove on each side of each of the discs, a connecting rod between a disc and each wing, a pin on said connecting rod and a roller on said pin engaging in the groove, said connecting rod having an enlarged end, a slot in this enlarged end, a roller in the slot mounted on said driving shaft, two shafts for the wings parallel to the driving shaft and below the level of the driving shaft.

4. In an aircraft with swinging wings the combination of a power engine, cam discs fastened on the driving shaft of said power engine, a groove on each side of said discs, a connecting rod for each groove and a wing, a pin on said connecting rod and a roller on said pin engaging in said groove, one cam disc and two opposite wings arranged in front of the vertical line of the centre of gravity, another cam disc and two opposite wings behind said vertical line, the groove on the front disc serving to move the left hand front wing similarly arranged to the groove on the rear disc moving the right hand rear wing, so that said wings swing simultaneously downwards, and owing to a similar arrangement the right hand front wing swings simultaneously downwards with the left hand rear wing for preventing the alternate forward and backward inclining of the flying aircraft.

5. In an aircraft with swinging wings the combination of a power engine, a shaft driven thereby, cam discs on said shaft, means for transmitting the power from the cam discs to the swinging wings, a half roof shaped surface in the middle portion in the direction of the longitudinal axis of the wing of which the considerably larger front portion has a slight inclination forwardly, and of which the smaller rear portion has a steep inclination rearwardly.

6. In an aircraft with swinging wings, the combination of a power engine, a shaft driven thereby, cam discs on said shaft, means for transmitting the power from the cam discs to the swinging wings, a half roof shaped surface in the middle portion in the direction of the longitudinal axis of the wing of which the considerably larger front part has a slight inclination forwardly and of which the smaller rear portion has a steep inclination rearwardly, openings in the middle wing part, flaps in these openings which are so constructed and arranged that the same are open during the upward swinging and closed during the downward swinging.

7. In an aircraft with swinging wings the combination of a power engine, a shaft driven thereby, cam discs on said shaft, means for transmitting the power from the cam discs to the swinging wings, wings with half roof shaped surfaces in the middle portion thereof, a flat seam surrounding these.

8. In an aircraft with swinging wings the combination of a power engine, a shaft driven thereby, cam discs on said shaft, means for transmitting the power from said cam discs to the swinging wings, a half roof shaped surface in the middle portion of the wing, a flat seam surrounding this half roof shaped middle portion of the wing, a larger part of the wing adjacent to the axis of rotation forming a flat plain, this plain part of the wing provided with large flapless openings which render the downward view from the cabin possible.

9. In an aircraft with swinging wings the combination of a power engine, a shaft driven thereby, cam discs on said shaft, connecting rods between said discs and the wings, a part of the wings in a distance from the axis of rotation half roof shaped, a flat seam surrounding this half roof shaped portion, a large part of the wing adjacent to the axis forming a flat plain provided with large flapless openings, the starting apparatus of the aircraft consisting of four pliable artificial legs and connecting rods, means for suddenly and simultaneously stretching the previously bent legs.

10. In an aircraft with swinging wings the combination of a power engine, a shaft driven thereby, cam discs on said shaft, rods connecting said discs with the wings, the part of the wing distant from the axis half roof shaped, a flat seam surrounding this half roof shaped portion of the wing, a large flat part of the wing adjacent to the axis of rotation provided with large flapless openings, the starting apparatus of the aircraft consisting of four pliable legs and connecting rods, each leg composed by an upper leg capable to swing forwards from its vertical position and backwards again to its vertical position with reference to the body of the aircraft, the lower end of said upper leg linked to the fulcrum of a two armed lever the longer arm of which forms the shank of said artificial leg, the shorter arm of said lever linked to the lower end of a connecting rod the upper end of which in front of the upper leg linked to the bottom of the body of the aircraft so as to bend said shank to said upper leg when the upper leg swings forwards from its vertical position, and to stretch said shank again when the upper leg returns to its vertical position; the lower end of said shank linked to the middle of a foot, the heel end of said foot thus connected by means of a link rod to a short process of the upper leg that said foot is at right angle to the shank in the half bent state of the leg, stretching the foot to the shank when said shank gets stretched to the upper leg, and bending the foot to the shank, when said shank gets bent to the upper leg; transverse shafts passing through the front ends at two front feet and two rear feet respectively, wheels rotatably fitted on both ends of said transverse shafts of the feet; transverse rods connecting two upper legs, a longitudinal rod connecting said transverse rods; the lower arm of a two armed lever rotatably mounted on a transverse axle linked to said longitudinal rod; a longitudinally directed cylinder in the body of the aircraft, a piston moving in said cylinder, a piston rod linked to said piston, the front end of said piston rod linked to the upper arm of said single two armed lever; a downwards directed opening in the wall of said cylinder permitting to escape the waste gases of an explosion, which stretches suddenly and simultaneously all the previously bent artificial legs, which lift the starting aircraft vertically upwards.

In testimony whereof I have signed my name to this specification this 24th day of March, 1926.

ADOLF EHRLICH.